US012249941B2

United States Patent
Murakami et al.

(10) Patent No.: US 12,249,941 B2
(45) Date of Patent: Mar. 11, 2025

(54) MOTOR CONTROL DEVICE, MOTOR CONTROL METHOD, AND NON-TRANSITORY COMPUTER-READABLE RECORDING MEDIUM

(71) Applicant: Panasonic Intellectual Property Management Co., Ltd., Osaka (JP)

(72) Inventors: Kenta Murakami, Osaka (JP); Atsuki Kyuhata, Osaka (JP); Kento Yoshino, Osaka (JP); Yosuke Majima, Osaka (JP); Benpei Kimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 27 days.

(21) Appl. No.: 18/245,089

(22) PCT Filed: Dec. 23, 2021

(86) PCT No.: PCT/JP2021/047781
§ 371 (c)(1),
(2) Date: Mar. 13, 2023

(87) PCT Pub. No.: WO2022/138794
PCT Pub. Date: Jun. 30, 2022

(65) Prior Publication Data
US 2024/0022201 A1    Jan. 18, 2024

(30) Foreign Application Priority Data

Dec. 23, 2020  (JP) ................ 2020-213144

(51) Int. Cl.
*G05B 19/416* (2006.01)
*H02P 29/00* (2016.01)
(52) U.S. Cl.
CPC ............... *H02P 29/00* (2013.01)

(58) Field of Classification Search
CPC ............... G05B 19/416; G05B 19/231; G05B 2219/41121; G05B 2219/43006; G05B 2219/42197; H02P 29/00
(Continued)

(56) References Cited

U.S. PATENT DOCUMENTS 5,936,366 A * 8/1999 Hamamura .......... G05B 19/404
                                                             318/560
7,719,219 B2 * 5/2010 Baumann ............. G05B 19/409
                                                             318/632

(Continued)

FOREIGN PATENT DOCUMENTS

JP    62-171016 A    7/1987
JP    08-006644 A    1/1996

(Continued)

OTHER PUBLICATIONS

Extended European Search Report dated May 14, 2024 issued in the corresponding European Patent Application No. 21910934.5.

(Continued)

*Primary Examiner* — Gabriel Agared
(74) *Attorney, Agent, or Firm* — Rimon P.C.

(57) ABSTRACT

A motor control device includes a control unit and a generation-method changer. The control unit generates a driving signal for driving a motor in accordance with a command signal and an encoder signal and outputs the generated driving signal to the motor, the command signal being a signal for setting the position of a moving part connected to the motor to a target position, the encoder signal indicating the position of the motor detected by an encoder. The generation-method changer changes a method used by the control unit to generate the driving signal in accordance with (Continued)

a position sensor signal indicating a detected target position that is the target position detected by a position sensor mounted on the moving part.

16 Claims, 7 Drawing Sheets

(58) Field of Classification Search
 USPC .......................................................... 318/466
 See application file for complete search history.

(56) References Cited

U.S. PATENT DOCUMENTS

| | | | | |
|---|---|---|---|---|
| 9,588,522 B2* | 3/2017 | Suzuki | ................... | G05B 21/02 |
| 2007/0103107 A1* | 5/2007 | Hayashi | ................ | B60L 3/0038 |
| | | | | 318/466 |
| 2009/0115366 A1* | 5/2009 | Mullet | ................... | E05F 15/41 |
| | | | | 310/75 R |
| 2009/0224717 A1 | 9/2009 | Sawaragi et al. | | |
| 2014/0139152 A1 | 5/2014 | Oyori et al. | | |

FOREIGN PATENT DOCUMENTS

| | | | |
|---|---|---|---|
| JP | 2004-334772 | A | 11/2004 |
| JP | 2005-267138 | A | 9/2005 |
| JP | 2009-217329 | A | 9/2009 |
| JP | 2012-253908 | A | 12/2012 |
| JP | 2018-041173 | A | 3/2018 |
| JP | 6824593 | B2 | 2/2021 |

OTHER PUBLICATIONS

International Search Report issued on Mar. 8, 2022 in International Patent Application No. PCT/JP2021/047781, with English translation.

* cited by examiner

| Sequence No. | | 1 | 2 | 3 | 4 |
|---|---|---|---|---|---|
| Target position indicated by command signal | | (5) 0 → 100 | (5) 100 → 150 | (5) 150 | (5) 150 → 200 |
| Position of moving part | | (0) 0<br>(7) 0 → 90<br>(10) 90 → 100<br>(14) 100 → 110 | (0) 110 | (0) 110<br>(8) 110 → 150 | (0) 150<br>(7) 150 → 175<br>(10) 175 → 195 |
| Motor control device | Visual FB Enabled/disabled | (1) Disabled → enabled | (1) Enabled | (1) Enabled → disabled | (1) Disabled → enabled |
| | Target position indicated by corrected command signal | (6) 0 → 100<br>(13) 100 → 110 | (7) 110 | (7) 110 → 150 | (6) 150 → 200<br>(13) 200 → 195 |
| | Correction value held by corrector | (4) 0 Held<br>(12) 10 Held | (4) 10 Held<br>(6) -40 Held | (4) -40 Held<br>(6) 0 Cleared | (4) 0 Held<br>(12) -5 Held |
| Position sensor | Position detection Detectable/undetectable | (2) Undetectable<br>(8) Detectable | (2) Detectable | (2) Undetectable | (2) Undetectable<br>(8) Detectable |
| | Amount of misregistration | (3) 0<br>(9) — → 20 Misregistration detected!<br>(11) 20 → 10<br>(15) 10 → 0 | (3) 0 | (3) — | (3) —<br>(9) — → 20 Misregistration detected!<br>(11) 20 → 0 |

MOTOR CONTROL DEVICE, MOTOR CONTROL METHOD, AND NON-TRANSITORY COMPUTER-READABLE RECORDING MEDIUM

CROSS-REFERENCE OF RELATED APPLICATIONS

This application is the U.S. National Phase under 35 U.S.C. § 371 of International Patent Application No. PCT/JP2021/047781, filed on Dec. 23, 2021, which in turn claims the benefit of Japanese Patent Application No. 2020-213144, filed on Dec. 23, 2020, the entire disclosures of which applications are incorporated by reference herein.

TECHNICAL FIELD

The present disclosure relates to a motor control device for controlling a motor.

BACKGROUND ART

Patent Literatures (PTLs) 1 and 2 disclose motor control devices for controlling a motor.
The aforementioned conventional motor control devices control a motor in accordance with information detected by sensors mounted on a moving part connected to the motor.

CITATION LIST

Patent Literature

[PTL 1]
  Japanese Patent No. 6824593
[PTL 2]
  Japanese Unexamined Patent Application Publication No. 2005-267138

SUMMARY OF INVENTION

Technical Problem

However, the motor control devices according to PTLs 1 and 2 described above can be improved upon.
It is an object of the present disclosure to provide a motor control device or the like that is capable of further improvement.

Solution to Problem

A motor control device according to one aspect of the present disclosure includes a control unit that generates a driving signal for driving a motor in accordance with a command signal and an encoder signal and outputs the driving signal generated to the motor, the command signal being a signal for setting a position of a moving part connected to the motor to a target position, the encoder signal indicating a position of the motor detected by an encoder, and a generation-method changer that changes a generation method used by the control unit to generate the driving signal, in accordance with a position sensor signal indicating a detected target position that is the target position detected by a position sensor mounted on the moving part.

A motor control method according to one aspect of the present disclosure includes generating a driving signal for driving a motor in accordance with a command signal and an encoder signal, and outputting the driving signal generated to the motor, the command signal being a signal for setting a position of a moving part connected to the motor to a target position, the encoder signal indicating a position of the motor detected by an encoder, and changing a method of generating the driving signal in the generating of the driving signal, in accordance with a position sensor signal indicating a detected target position that is the target position detected by a position sensor mounted on the moving part.

A non-transitory computer-readable recording medium according to one aspect of the present disclosure is a non-transitory computer-readable recording medium having recorded thereon a program for causing a motor control device that controls a motor to execute motor control processing. The motor control processing includes generating a driving signal for driving the motor in accordance with a command signal and an encoder signal, and outputting the driving signal generated to the motor, the command signal being a signal for setting a position of a moving part connected to the motor to a target position, the encoder signal indicating a position of the motor detected by an encoder, and changing a method of generating the driving signal in the generating of the driving signal, in accordance with a position sensor signal indicating a detected target position that is the target position detected by a position sensor mounted on the moving part.

Advantageous Effects of Invention

The motor control device or the like according to one aspect of the present disclosure is capable of further improvement.

DESCRIPTION OF EMBODIMENTS (Circumstances Leading to One Aspect of the Present Disclosure)
When a motor control device for controlling a motor drives a motor in accordance with a command signal for setting the position of a moving part connected to the motor to a target position and an encoder signal indicating the position of the motor detected by the encoder, the position of the moving part may differ from an actual target position.
The inventors of the present disclosure have found the above problem and conceived a motor control device or the like described below in order to solve this problem.
A motor control device according to one aspect of the present disclosure includes a control unit that generates a driving signal for driving a motor in accordance with a command signal and an encoder signal and outputs the driving signal generated to the motor, the command signal being a signal for setting a position of a moving part connected to the motor to a target position, the encoder signal indicating a position of the motor detected by an encoder, and a generation-method changer that changes a generation method used by the control unit to generate the driving signal, in accordance with a position sensor signal indicating a detected target position that is the target position detected by a position sensor mounted on the moving part.

The motor control device with the above-described configuration changes the method of generating the driving signal for driving the motor, in accordance with the detected target position detected by the position sensor mounted on the moving part. Accordingly, the motor control device with the above-described configuration is capable of setting the position of the moving part to an actual target position.

As described above, the motor control device with the above-described configuration is capable of further improvement.

The motor control device may further include a selector that switches between whether the generation-method changer enables or disables change of the generation method.

Accordingly, it is possible to accomplish switching between whether the generation-method changer enables or disables change of the generation method, depending on the detected target position detected by the position sensor.

When there is a difference between the target position and the detected target position, the generation-method changer (1) may generate a correction value for correcting the command signal so that the target position is changed by the difference, and (2) change the generation method so that the driving signal is generated based on the encoder signal and the command signal corrected by the correction value.

Accordingly, it is possible to set the position of the moving part to the target position, using the command signal corrected by the correction value.

The generation-method changer may further output the correction value to a controller that generates the command signal.

This enables the controller to generate the command signal that reflects the correction value.

When there is a difference between the target position and the detected target position, the generation-method changer (1) may temporarily stop the motor, (2) after an elapse of a first predetermined time from temporarily stopping the motor, generate a correction value for correcting the command signal so that the target position is changed by the difference, and (3) change the generation method so that the driving signal is generated based on the encoder signal and the command signal corrected by the correction value.

The motor control device with the above-described configuration generates the correction value after damping of oscillations of the moving part. This increases the accuracy of setting the position of the moving part to the target position.

The generation-method changer may further output the correction value to a controller that generates the command signal.

This enables the controller to generate the command signal that reflects the correction value.

The generation-method changer may reset the correction value when a first predetermined condition is satisfied.

Accordingly, it is possible to reduce the occurrence of adverse effects that may be caused by resetting the correction value, while suppressing an excessive increase in the correction value caused by accumulated misregistration of the moving part relative to the target position.

The first predetermined condition may include a condition that the motor is running, and the generation-method changer may reset the correction value so that the correction value gradually approaches zero and ultimately becomes zero while the motor is running In general, adverse effects such as a sudden move of the motor may be caused by resetting the correction value when the motor is at standstill.

The motor control device with the above-described configuration is capable of reducing the occurrence of such adverse effects. Besides, the motor control device with the above-described configuration is capable of reducing the occurrence of adverse effects that may be caused by setting the correction value to zero at once.

The generation-method changer may change the generation method so that the driving signal is generated by changing a gain parameter in accordance with the position sensor signal, the gain parameter being a parameter for determining a gain of the driving signal relative to the command signal.

Accordingly, it is possible to change the gain parameter in accordance with the position sensor signal.

The generation-method changer may change the generation method in accordance with also an acceleration sensor signal that indicates an acceleration of the moving part detected by an acceleration sensor mounted on the moving part.

This increases the accuracy of setting the position of the moving part to the target position.

The motor control device may further include a selector that switches between whether the generation-method changer enables or disables change of the generation method.

Accordingly, it is possible to accomplish switching between whether to enable or disable the change of the method of generating the driving signal for driving the motor, depending on the detected target position detected by the position sensor and the acceleration of the moving part detected by the acceleration sensor.

When there is a difference between the target position and the detected target position and after an elapse of a second predetermined time or more while the acceleration of the moving part indicated by the acceleration sensor signal is less than or equal to a predetermined threshold value, the generation-method changer may (1) generate a correction value for correcting the command signal so that the target position is changed by the difference, and (2) change the generation method so that the driving signal is generated based on the encoder signal and the command signal corrected by the correction value.

The motor control device with the above-described configuration is capable of generating the correction value after damping of oscillations of the moving part. This increases the accuracy of setting the position of the moving part to the target position.

The generation-method changer may reset the correction value when a second predetermined condition is satisfied.

Accordingly, it is possible to reduce the occurrence of adverse effects that may be caused by resetting the correction value, while suppressing an excessive increase in the correction value caused by accumulated misregistration of the moving part relative to the target position.

The second predetermined condition may include a condition that the motor is running, and the generation-method changer may reset the correction value so that an absolute value of the correction value gradually approaches zero and ultimately becomes zero while the motor is running.

In general, adverse effects such as a sudden move of the motor may be caused by resetting the correction value when the motor is at standstill.

The motor control device with the above-described configuration is capable of reducing the occurrence of such adverse effects. Besides, the motor control device with the above-described configuration is capable of reducing the occurrence of adverse effects that may be caused by setting the correction value to zero at once.

The generation-method changer may further output the correction value to a controller that generates the command signal.

This enables the controller to generate the command signal that reflects the correction value.

The generation-method changer may change the generation method so that the driving signal is generated by changing a gain parameter in accordance with at least one of the position sensor signal or the acceleration sensor signal, the gain parameter being a parameter for determining a gain of the driving signal relative to the command signal.

Accordingly, it is possible to change the gain parameter in accordance with at least one of the position sensor signal or the acceleration sensor signal.

A motor control method according to one aspect of the present disclosure includes generating a driving signal for driving a motor in accordance with a command signal and an encoder signal, and outputting the driving signal generated to the motor, the command signal being a signal for setting a position of a moving part connected to the motor to a target position, the encoder signal indicating a position of the motor detected by an encoder, and changing a method of generating the driving signal in the generating of the driving signal, in accordance with a position sensor signal indicating a detected target position that is the target position detected by a position sensor mounted on the moving part.

The above-described motor control method changes the method of generating the driving signal for driving the motor, depending on the detected target position detected by the position sensor mounted on the moving part. Accordingly, it is possible with the above-described motor control method to set the position of the moving part to an actual target position.

In this way, the above-described motor control method provides a motor control device that is capable of further improvement.

A non-transitory computer-readable recording medium according to one aspect of the present disclosure is a non-transitory computer-readable recording medium having recorded thereon a program for causing a motor control device that controls a motor to execute motor control processing. The motor control processing includes generating a driving signal for driving the motor in accordance with a command signal and an encoder signal, and outputting the driving signal generated to the motor, the command signal being a signal for setting a position of a moving part connected to the motor to a target position, the encoder signal indicating a position of the motor detected by an encoder, and changing a method of generating the driving signal in the generating of the driving signal, in accordance with a position sensor signal indicating a detected target position that is the target position detected by a position sensor mounted on the moving part.

The program described above changes the method of generating the driving signal for driving the motor, depending on the detected target position detected by the position sensor mounted on the moving part. Accordingly, it is possible with the above-described non-transitory computer-readable recording medium to set the position of the moving part to an actual target position.

In this way, the non-transitory computer-readable recording medium described above provides a motor control device that is capable of further improvement.

The following describes specific examples of the motor control device according to one aspect of the present disclosure with reference to drawings. Each embodiment described below shows a specific example. Therefore, numerical values, shapes, materials, constituent elements, arrangement and connection form of constituent elements, steps, the order of steps, and so on described in the following embodiments are mere examples and do not intend to limit the scope of the present disclosure. Note that the drawings are schematic diagrams and are not necessarily precise illustrations. Constituent elements that are substantially the same are given the same reference numerals throughout the drawings, and their detailed description is omitted or simplified.

Embodiment 1

The following describes a motor control system according to Embodiment 1. This motor control system is a system for controlling a motor to move a moving part connected to the motor to a target position. The motor control system may, for example, be a production device for mounting components on a substrate.

(Configuration)

Figure 1:
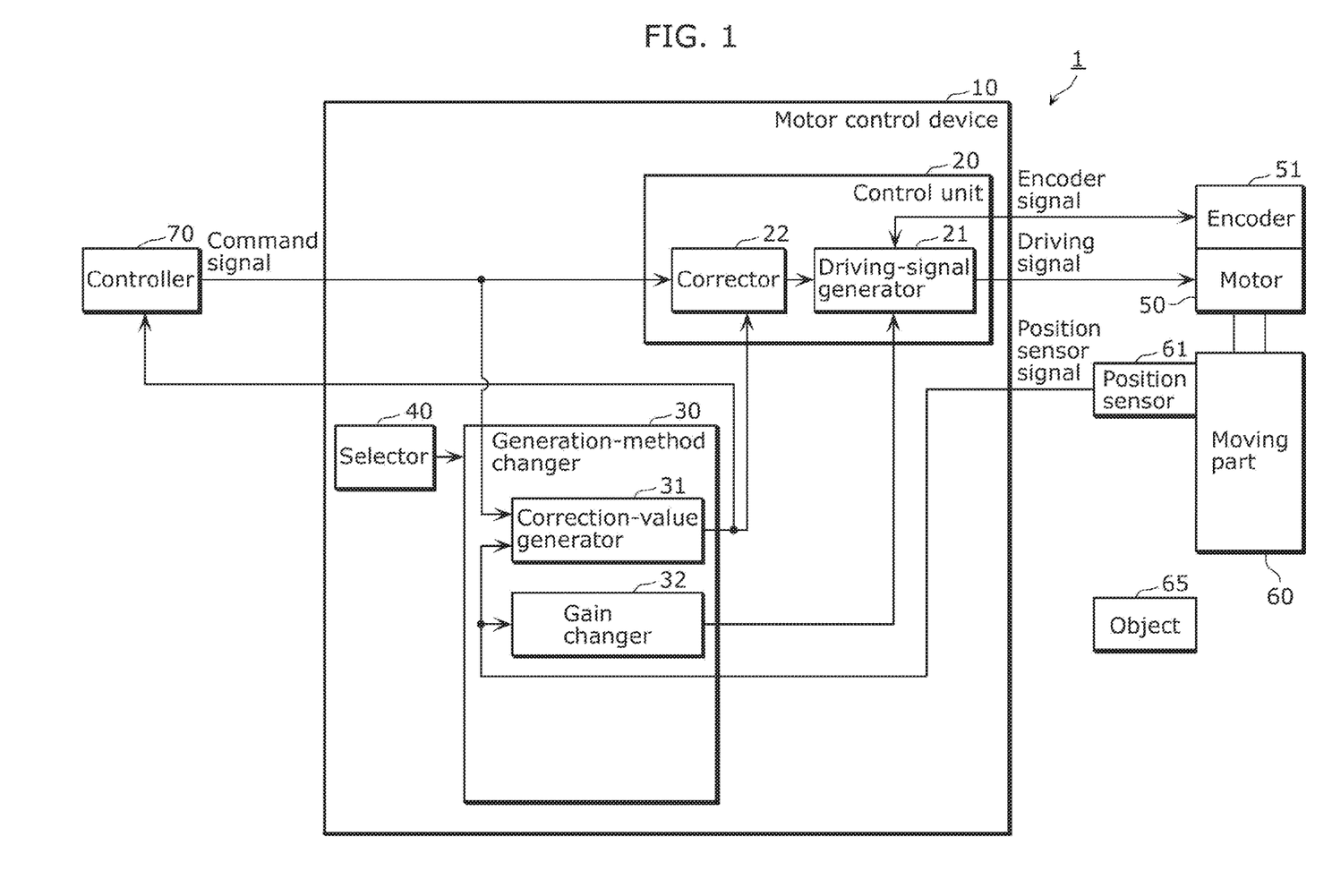
FIG. 1 is a block diagram illustrating a configuration of a motor control system according to Embodiment 1.

FIG. 1 is a block diagram illustrating a configuration of motor control system 1 according to Embodiment 1.

As illustrated in FIG. 1, motor control system 1 includes motor control device 10, motor 50, moving part 60, controller 70, encoder 51, position sensor 61, and object 65.

Motor 50 is driven by a driving signal that is output from motor control device 10. Here, motor 50 is described as a rotary motor. Motor 50 is, however, not necessarily limited to a rotary motor, and for example may be a linear motor.

The driving signal may, for example, be a current for rotating motor 50.

Encoder 51 detects the position of motor 50 and outputs an encoder signal indicating the detected position of motor 50 to motor control device 10.

Moving part 60 is connected to motor 50. For example, in the case where motor control system 1 is a production device for mounting components on a substrate, moving part 60 may serve a header that transports the components to their mounting positions.

Controller 70 generates a command signal for setting the position of moving part 60 to a target position and outputs the generated command signal to motor control device 10. For example, the command signal may be a position command signal indicating a position command for setting the position of moving part 60 to the target position, a speed command signal indicating a speed command for setting the position of moving part 60 to the target position, an acceleration command signal indicating an acceleration command for setting the position of moving part 60 to the target position, or a torque command signal indicating a torque command for setting the position of moving part 60 to the target position.

Object 65 is placed at the target position. That is, the position of object 65 is the target position.

Position sensor 61 is mounted on moving part 60 to detect the position of object 65 and output a position sensor signal indicating the detected position of object 65 to motor control device 10. That is, position sensor 61 detects the detected target position corresponding to the target position, i.e., an actual target position, and outputs a sensor signal indicating the detected target position to motor control device 10.

Position sensor 61 may be realized by, for example, an imaging device. In this case, for example, the imaging device may capture an image within an imaging range, and when object 65 is present within the imaging range, may perform image processing on the captured image and calculate a deviation of the location of object 65 placed at the target position from the location of moving part 60 to obtain the detected target position.

Alternatively, position sensor 61 may be realized by, for example, a displacement sensor. For example, position sensor 61 may be realized by a transmission laser displacement sensor, and when object 65 is located at a position where laser light is shielded, may calculate a deviation of the location of the target position at which object 65 provides a predetermined amount of shielding or a predetermined shielding pattern from the location of position sensor 61 to obtain the detected target position.

Motor control device 10 receives input of the command signal, the encoder signal, and the position sensor signal and outputs the driving signal.

For example, motor control device 10 may be implemented via computer equipment that includes a processor, a memory, and an input/output interface and in which the processor executes programs stored in the memory. Motor control device 10 may also be implemented via, for example, a dedicated hardware circuit. Motor control device 10 may also be implemented via a combination of a dedicated hardware circuit and computer equipment in which the processor executes programs stored in the memory.

Motor control device 10 includes control unit 20, generation-method changer 30, and selector 40.

Control unit 20 generates a motor driving signal for driving motor 50 in accordance with the command signal output from controller 70 and the encoder signal output from encoder 51, and outputs the generated motor driving signal to motor 50.

Control unit 20 includes driving-signal generator 21 and corrector 22.

Corrector 22 stores a correction value that is output from generation-method changer 30. The correction value as used herein refers to a signal for correcting the command signal such that, when there is a difference between the target position indicated by the command signal and the detected target position indicated by the position sensor signal, the target position is corrected by that difference. The description here assumes that corrector 22 in the initial state stores a correction value indicating not to correct the command signal. The description also assumes that the correction value indicating not to correct the command signal is 0 (zero).

Upon receiving input of the command signal, corrector 22 corrects the command signal in accordance with the stored correction value and outputs the corrected command signal (hereinafter, also referred to as the "corrected command signal") to driving-signal generator 21.

In the case where a predetermined condition is satisfied, corrector 22 may reset the correction value (set the correction value to the initial value). The predetermined condition as used herein may preferably be a condition that is capable of reducing the occurrence of adverse effects that may be caused by resetting the correction value. The predetermined condition may, for example, be the condition that motor 50 is running.

In general, if the correction value is reset while motor 50 is at standstill, adverse effects such as a sudden motion of motor 50 may possibly occur. Therefore, corrector 22 is capable of reducing the occurrence of such adverse effects by resetting the correction value while motor 50 is running.

Alternatively, corrector 22 may reset the correction value in such a manner that the correction value gradually approaches zero and ultimately becomes zero while motor 50 is running. In this case, it is possible to further reduce the occurrence of adverse effects that may be caused by resetting the correction value to zero at once.

Driving-signal generator 21 generates the driving signal by performing feedback control for feeding back the encoder signal output from encoder 51 to the corrected command signal output from corrector 22, and outputs the generated driving signal to motor 50.

Generation-method changer 30 changes the method used by control unit 20 to generate the driving signal, in accordance with the position sensor signal.

Generation-method changer 30 includes correction-value generator 31 and gain changer 32.

In the case where there is a difference between the target position indicated by the command signal and the detected target position indicated by the position sensor signal, correction-value generator 31 generates the correction value for correcting the command signal such that the target position is changed by that difference, and outputs the generated correction value to corrector 22.

Correction-value generator 31 updates the correction value stored in corrector 22 by outputting the generated correction value to corrector 22. In this way, correction-value generator 31 changes the method used by control unit 20 to generate the driving signal so as to generate the driving signal in accordance with the encoder signal and the corrected command value corrected using the updated correction value.

Correction-value generator 31 may also output the generated correction value to controller 70. This enables controller 70 to generate a command signal that reflects the correction value.

Gain changer 32 changes, in accordance with the position sensor signal, a gain parameter of driving-signal generator 21 for determining the gain of the driving signal relative to the command signal. Accordingly, gain changer 32 changes the method used by control unit 20 to generate the driving signal such that the driving signal is generated based on the gain determined by the changed gain parameter. For example, gain changer 32 may change the gain parameter of driving-signal generator 21 when the difference between the target position and the position of moving part 60 indicated by the position sensor signal is greater than or equal to a predetermined value.

Selector 40 switches between whether generation-method changer 30 enables or disables the change of the method used by control unit 20 to generate the driving signal.

For example, selector 40 may perform the above switching in accordance with the command given by controller 70. As another alternative, for example, selector 40 may have the function of accepting operation from a user who uses motor control device 10 and may perform the above switching in accordance with the accepted user operation.

By way of example, the description describes a case in which generation-method changer 30 operates in either a first operation mode of enabling the change of the method used by control unit 20 to generate the driving signal or a second operation mode of disabling that change, and selector 40 switches the operation mode of generation-method changer 30 between the first operation mode and the second operation mode. In this way, selector 40 switches between whether generation-method changer 30 enables or disables the change of the method used by control unit 20 to generate the driving signal.

(Operations)

The following describes operations performed by motor control device 10 having the above-described configuration.

Motor control device 10 performs first motor control processing for controlling motor 50 in accordance with the command signal, the encoder signal, and the position sensor signal. For example, the first motor control processing may be started when a user who uses motor control device 10 performs an operation of starting the first motor control processing on motor control device 10.

Figure 2:
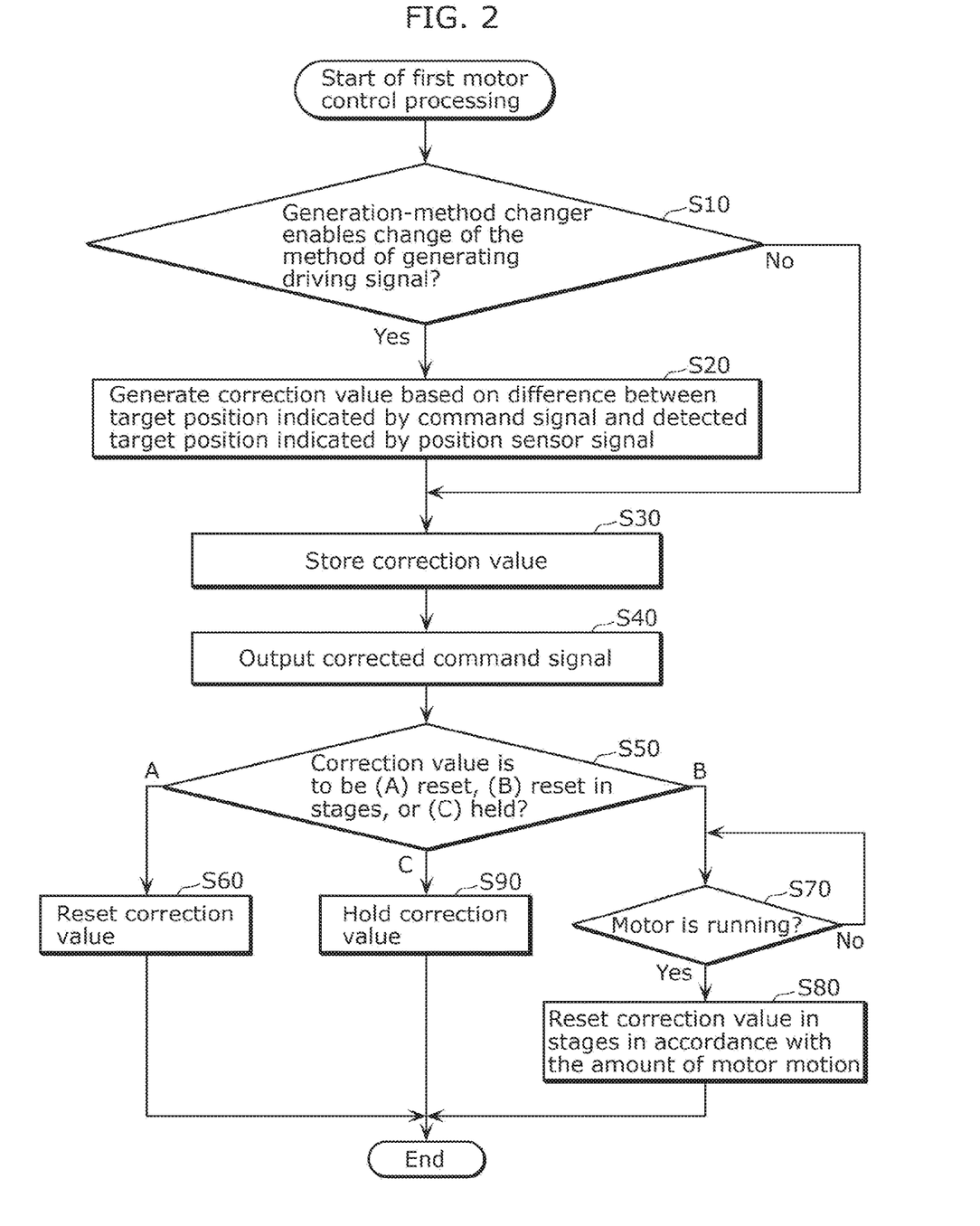
FIG. 2 is a flowchart of first motor control processing according to Embodiment 1.

FIG. 2 is a flowchart of the first motor control processing performed by motor control device 10.

As illustrated in FIG. 2, when the first motor control processing is started, generation-method changer 30 checks whether generation-method changer 30 enables or disables the change of the method used by control unit 20 to generate the driving signal (step S10). That is, generation-method changer 30 checks whether or not its own operation mode is a first operation mode.

In the processing in step S10, if generation-method changer 30 enables the change of the method used by control unit 20 to generate the driving signal (Yes in step S10), correction-value generator 31 generates a correction value based on a difference between the target position indicated by the command signal and the detected target position indicated by the position sensor signal (step S20). That is, when there is a difference between the target position indicated by the command signal and the detected target position indicated by the position sensor signal, correction-value generator 31 generates the correction value that corrects the command signal to change the target position by the difference.

When the processing in step S20 ends, corrector 22 stores the generated correction value. In the processing in step S10, if generation-method changer 30 disables the change of the method used by control unit 20 to generate the driving signal (No in step S10), corrector 22 holds the correction value stored therein as-is (step S30). Then, corrector 22 corrects the command signal in accordance with the stored correction value and outputs the corrected command signal to driving-signal generator 21 (step S40).

Next, corrector 22 checks which of the following (A) to (C) is true (step S50): (A) the condition for resetting the stored correction value is satisfied; (B) the condition for resetting the correction value such that the correction value gradually approaches zero and ultimately becomes zero while motor 50 is running; and (C) neither of the above conditions (the condition for resetting the stored correction value nor the condition for resetting the correction value such that the correction value gradually approaches zero and ultimately becomes zero is satisfied) is satisfied, i.e., the condition for holding the stored correction value is satisfied.

In the processing in step S50, if the condition for resetting the stored correction value is satisfied (A in step S50), corrector 22 resets the stored correction value (step S60).

In the processing in step S50, if the condition for resetting the correction value such that the correction value gradually approaches zero and ultimately becomes zero while motor 50 is running is satisfied (B in step S50), corrector 22 checks whether motor 50 is running (step S70).

In the processing in step S70, if motor 50 is not running (No in step S70), corrector 22 repeats the processing in step S70 until motor 50 is activated.

In the processing in step S70, if motor 50 is running (Yes in step S70), corrector 22 resets the correction value such that the stored correction value gradually approaches zero and ultimately becomes zero, depending on the amount of motion of motor 50 (step S80).

In the processing in step S50, if the condition for holding the stored correction value is satisfied (C in step S50), corrector 22 holds the stored correction value, instead of resetting it (step S90).

When the processing in step S60, S80, or S90 ends, motor control device 10 ends the first motor control processing.

SPECIFIC EXAMPLE

The following describes a first specific example of operations, i.e., one example of specific operations performed by motor control device 10 having the above-described configuration.

Figure 3:
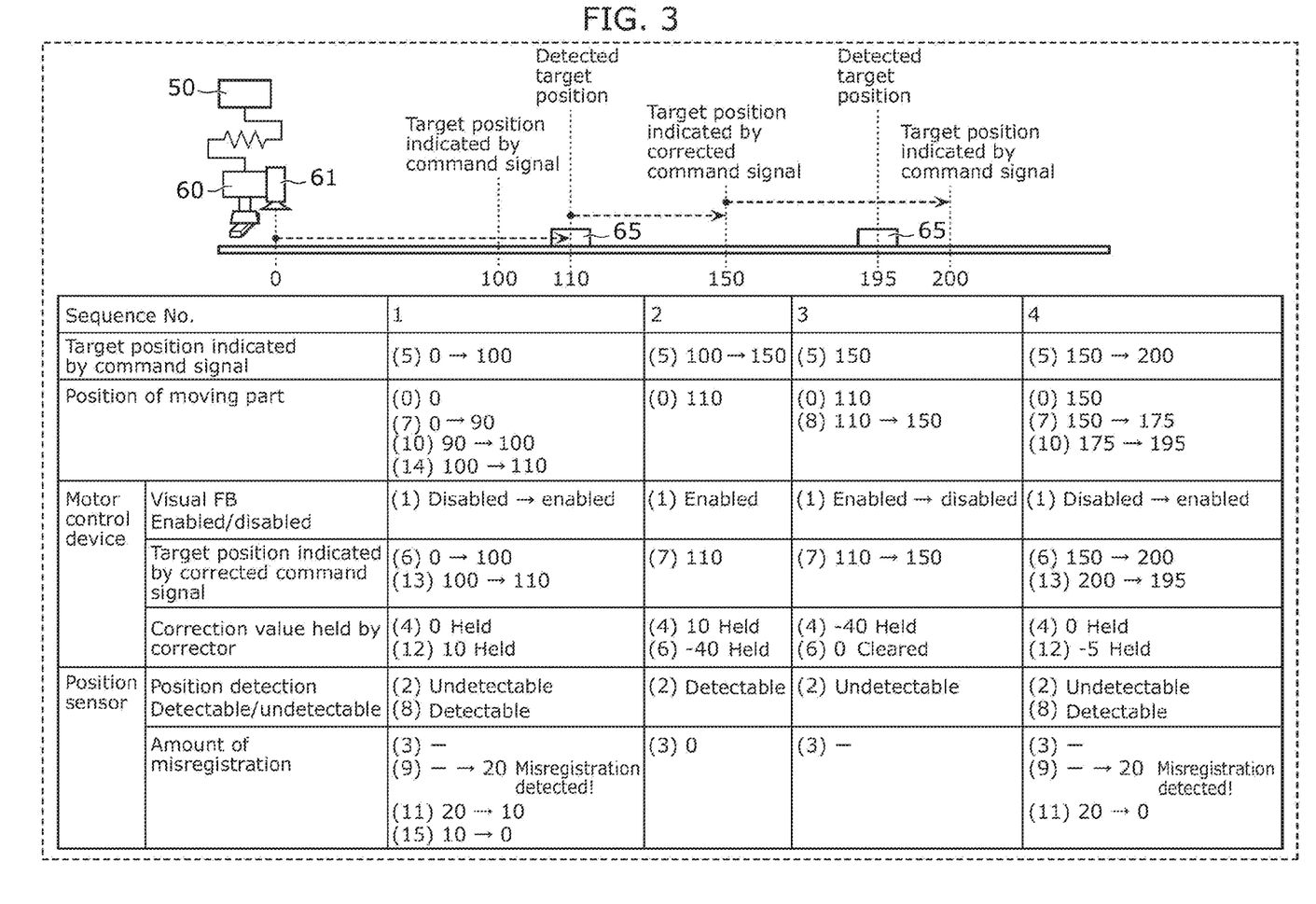
FIG. 3 is a schematic diagram illustrating a first specific example of operations performed by the motor control device according to Embodiment 1.

FIG. 3 is a schematic diagram illustrating the first specific example of operations performed by motor control device 10.

A first specific example of operations is an example of operations performed in the following case including sequences numbered 1 to 4. In sequence No. 1, the detected target position, i.e., the actual target position, is located at position 110, in spite of the fact that controller 70 outputs a control command to move the target position of moving part 60 assumed by controller 70 from position 0 (zero) in the initial state to position 100. In sequence No. 2, controller 70 outputs a control command to move the target position of moving part 60 assumed by controller 70 from position 100 to position 150, but the driving signal is generated so as to maintain the position of moving part 60 at position 110 because generation-method changer 30 enables the change of the method used by control unit 20 to generate the driving signal. In sequence No. 3, selector 40 switches generation-method changer 30 from enabling the change of the method used by control unit 20 to generate the driving signal to disabling the change, and the correction value stored in corrector 22 is cleared to zero, whereas controller 70 continues to output a control command to move the target position of moving part 60 assumed by controller 70 from position 100 to position 150. In sequence No. 4, the detected target position is located at position 195, in spite of the fact that controller 70 outputs a control command to move the target position of moving part 60 assumed by controller 70 from position 150 to position 200.

In the first specific example, position sensor 61 is either an imaging device or a transmission laser displacement sensor and configured to be capable of detecting the position of object 65 if the position of object 65 is within plus or minus 20 from the position of position sensor 61 mounted on moving part 60.

As illustrated in FIG. 3, in sequence No. 1 in the first specific example of operations, (0) moving part 60 is first located at position 0. Next, (1) selector 40 switches generation-method changer 30 from disabling the change of the method used by control unit 20 to generate the driving signal (hereinafter, also referred to as "visual FB disabled") to enabling the change (hereinafter, also referred to as "visual FB enabled").

At this time, since the position of object 65 is outside the detectable range of position sensor 61, (2) position sensor 61 does not detect the position of object 65. Thus, (3) a difference between the position of moving part 60 and the detected target position detected by position sensor 61 cannot be calculated. Accordingly, (4) corrector 22 holds the correction value at the initial value of 0 (zero).

Next, (5) controller 70 outputs a command signal to move the target position of moving part 60 assumed by controller 70 from position 0 to position 100. Since the stored correction value is 0, (6) corrector 22 does not correct the command signal and outputs the command signal as-is as a corrected command signal to driving-signal generator 21. Accordingly, driving-signal generator 21 generates a driving signal and drives motor 50 by performing feedback control for feeding back the encoder signal output from encoder 51 to the corrected command signal output from corrector 22. As a result, (7) moving part 60 is moved to the target position assumed by controller 70.

(7) When moving part 60 is located at position 90, (8) the position of object 65 falls within the detectable range of position sensor 61. Thus, position sensor 61 detects the position of object 65. In the present example, (9) position sensor 61 detects that the position of moving part 60 is 20 short of the detected target position. Since the position of moving part 60 reaches neither the detected target position nor the target position of moving part 60 assumed by controller 70, (10) the position of moving part 60 is moved to position 100 in accordance with the command signal output from controller 70. In the present example, (11) position sensor 61 detects that the position of moving part 60 is 10 short of the detected target position. Since the position of moving part 60 does not reach the detected target position, but reaches the target position of moving part 60 assumed by controller 70, correction-value generator 31 generates a correction value of 10 that indicates a difference between the detected target position and the target position of moving part 60 assumed by controller 70, and outputs correction value 10 to corrector 22. Upon receipt of this, (12) corrector 22 holds the correction value of 10. Then, (13) corrector 22 outputs a corrected command signal to move the position of moving part 60 to corrected target position 110. Accordingly, driving-signal generator 21 generates a driving signal and drives motor 50 by performing feedback control for feeding back the encoder signal output from encoder 51 to the corrected command signal output from corrector 22. (14) As a result, moving part 60 is moved to position 110. (15) Accordingly, the difference between the corrected target position of moving part 60 assumed by controller 70 and the detected target position indicating the position of object 65 detected by position sensor 61, i.e., the actual target position, becomes 0.

In sequence No. 2, first, (0) moving part 60 is located at position 0. Then, (1) selector 40 maintains generation-method changer 30 in a state of enabling the change of the method used by control unit 20 to generate the driving signal, without switching. At this time, (2) the position of object 65 falls within the detectable range of position sensor 61. Thus, (3) the difference between the corrected target position of moving part 60 assumed by controller 70 and the detected target position indicating the position of object 65 detected by position sensor 61 becomes 0. At this time, (4) corrector 22 holds a correction value of 10.

Next, (5) controller 70 outputs a command signal to move the target position of moving part 60 assumed by controller 70 from position 100 to position 150. However, correction-value generator 31 tries to maintain the detected target position of object 65 and accordingly generates a correction value of −40 and outputs the correction value to corrector 22. Upon receipt of this, (6) corrector 22 holds the correction value of −40. As a result, (7) the command signal output from corrector 22 remains at 110 and accordingly moving part 60 remains located at position 110.

In sequence No. 3, first, (0) moving part 60 is located at position 110. Next, (1) selector 40 switches generation-method changer 30 from visual FB enabled to visual FB disabled. At this point in time, moving part 60 is not moved. In this case, (2) position sensor 61 does not detect the position of object 65. Therefore, (3) the difference between the position of moving part 60 and the detected target position detected by position sensor 61 cannot be calculated. Thus, (4) corrector 22 holds the correction value of −40. (5) The target position indicated by the command signal at this time is 150, and the target position indicated by the corrected command signal at this time is 110.

Next, corrector 22 resets the stored correction value of −40. As a result, (6) corrector 22 holds a correction value of 0. Then, (7) corrector 22 outputs a corrected command signal to move the position of moving part 60 to the corrected target position, i.e., position 150. Accordingly, driving-signal generator 21 generates a driving signal and drives motor 50 by performing feedback control for feeding back the encoder signal output from encoder 51 to the corrected command signal output from corrector 22. As a result, (8) moving part 60 is moved to position 150.

In sequence No. 4, first, (0) moving part 60 is located at position 150. Then, (1) selector 40 switches generation-method changer 30 from visual FB disabled to visual FB enabled. At this time, since the position of object 65 is outside the detectable range of position sensor 61, (2) position sensor 61 does not detect the position of object 65. Thus, (3) the difference between the position of moving part 60 and the detected target position detected by position sensor 61 cannot be calculated. Accordingly, (4) corrector 22 holds a correction value at the initial value of 0 (zero).

Next, (5) controller 70 outputs a command signal to move the target position of moving part 60 assumed by controller 70 from position 150 to position 200. Since the stored correction value is 0, (6) corrector 22 does not correct the command signal and outputs the command signal as-is as a corrected command signal to driving-signal generator 21. Accordingly, driving-signal generator 21 generates a driving signal and drives motor 50 by performing feedback control for feeding back the encoder signal output from encoder 51 to the corrected command signal output from corrector 22. As a result, (7) moving part 60 is moved to the target position assumed by controller 70.

(7) When moving part 60 is located at position 175, (8) the position of object 65 falls within the detectable range of position sensor 61. Thus, position sensor 61 detects the position of object 65. In the present example, (9) position sensor 61 detects that the position of moving part 60 is 20 short of the detected target position. Since the position of moving part 60 reaches neither the detected target position nor the target position of moving part 60 assumed by controller 70, (10) the position of moving part 60 is moved to position 195 in accordance with the command signal output from controller 70, and (11) position sensor 61 detects that moving part 60 is located at the detected target position. Since the position of moving part 60 reaches the detected target position, but does not reach the target position of moving part 60 assumed by controller 70, correction-value generator 31 generates a correction value of −5 and outputs the correction value to corrector 22, the correction value of −5 that indicates a difference between the detected target position and the target position of moving part 60 assumed by controller 70, and outputs the correction value to corrector 22. Upon receipt of this, (12) corrector 22 holds the correction value of −5. Then, (13) corrector 22 outputs a corrected command signal to move the position of moving part 60 to the corrected target position, i.e., position 195. Accordingly, driving-signal generator 21 generates a driving signal and drives motor 50 by performing feedback control for feeding back the encoder signal output from encoder 51 to the corrected command signal output from corrector 22. As a result, moving part 60 remains located at position 195. Accordingly, the difference between the corrected target position of moving part 60 assumed by controller 70 and the detected target position indicating the position of object 65 detected by position sensor 61, i.e., the actual target position, remains at 0.

[Consideration]

As described thus far, motor control device 10 with the above-described configuration is capable of moving moving part 60 to the actual target position, even in the case where the position of moving part 60 may become different from the actual target position if moving part 60 is moved directly to the target position indicated by the command signal.

In this way, motor control device 10 with the above-described configuration is capable of further improvement.

Note that in sequence No. 3 in the first specific example, corrector 22 may reset the correction value such that the correction value gradually approaches zero and ultimately becomes zero while motor 50 is running in order to move the position of moving part 60 from position 110 to position 150.

Embodiment 2

The following describes a motor control system according to Embodiment 2 configured by changing part of motor control system 1 according to Embodiment 1.

The following description of the motor control system according to Embodiment 2 focuses on points of difference from motor control system 1 according to Embodiment 1, while assuming that constituent elements that are similar to those of motor control system 1 have already been described and are thus given the same reference signs, and therefore omitting detailed description of those constituent elements.

Figure 4:
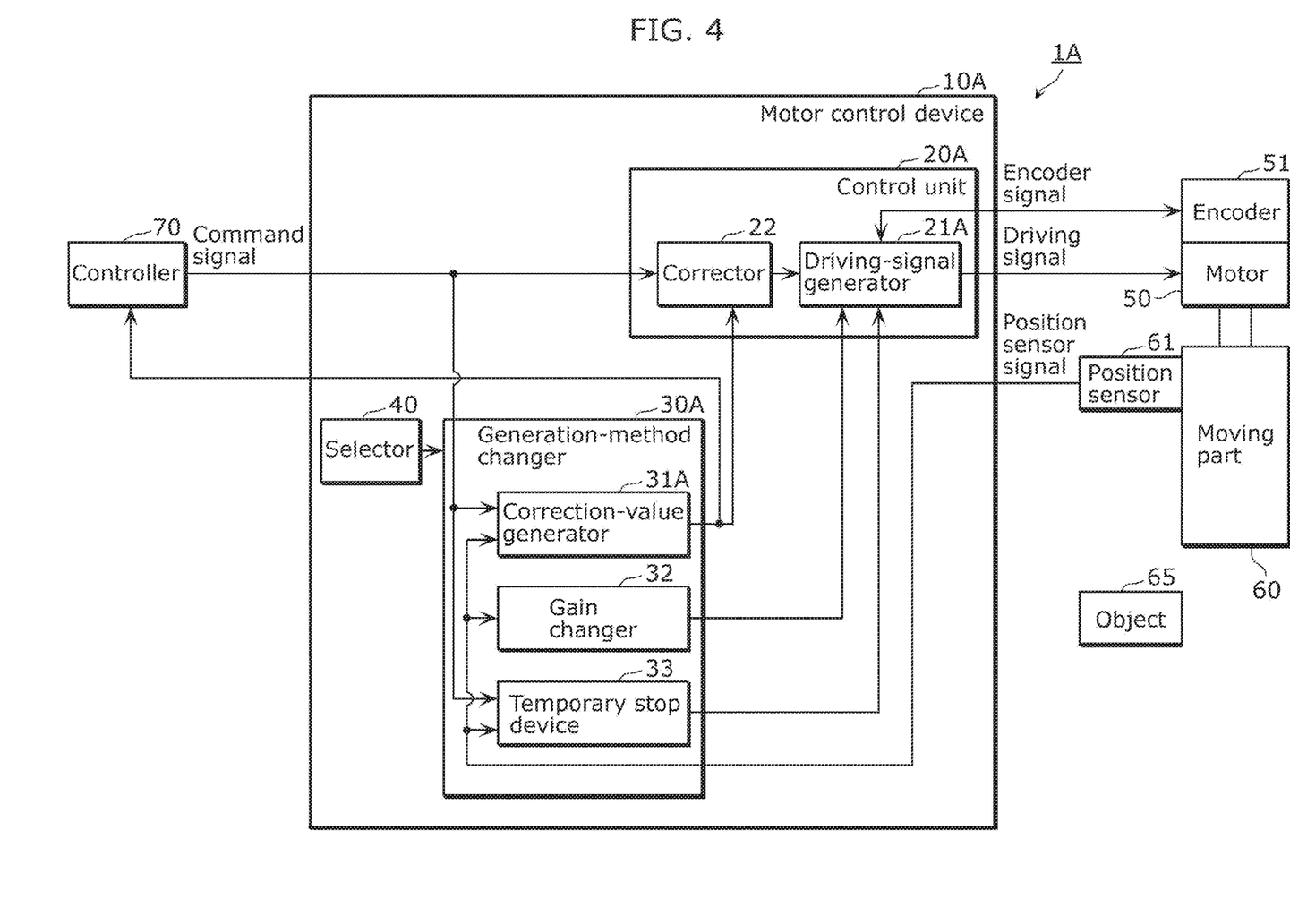
FIG. 4 is a block diagram illustrating a configuration of a motor control system according to Embodiment 2.

FIG. 4 is a block diagram illustrating a configuration of motor control system 1A according to Embodiment 2.

As illustrated in FIG. 4, motor control system 1A is configured by changing motor control device 10 in motor control system 1 according to Embodiment 1 into motor control device 10A. Motor control device 10A is configured by changing control unit 20 and generation-method changer 30 of motor control device 10 into control unit 20A and generation-method changer 30A, respectively. Control unit 20A is configured by changing driving-signal generator 21 of control unit 20 into driving-signal generator 21A. Generation-method changer 30A is configured by changing correction-value generator 31 of generation-method changer 30 into correction-value generator 31A and adding temporary stop device 33.

When a difference occurs between the target position indicated by the command signal and the detected target position indicated by the position sensor signal, temporary stop device 33 outputs a motor stop signal for stopping stop motor 50 to driving-signal generator 21A. Then, after an elapse of first predetermined time T1 since the occurrence of the difference, temporary stop device 33 stops outputting the motor stop signal. First predetermined time T1 as used herein may preferably be the duration of time that is longer than or equal to the duration of time from the stop of motor 50 to the damping of oscillations of moving part 60.

Driving-signal generator 21A further has, in addition to the function of driving-signal generator 21 according to Embodiment 1, a function of generating a motor control signal for stopping motor 50 during a period of time in which temporary stop device 33 is outputting the motor stop signal, and then outputting the generated motor control signal to motor 50. Accordingly, motor 50 stops until the elapse of first predetermined time T1 from the occurrence of the difference.

When a difference occurs between the target position and the position of moving part 60 indicated by the position sensor signal, correction-value generator 31A waits for until the elapse of first predetermined time T1 from the occurrence of the difference, and when first predetermined time T1 has elapsed and there is still the difference between the target position indicated by the signal and the detected target position indicated by the position sensor signal, generates a correction value for correcting the command signal such that the target position is changed by the difference, and outputs the generated correction value to corrector 22.

Correction-value generator 31A updates the correction value stored in corrector 22 by outputting the generated correction value to corrector 22. Accordingly, correction-value generator 31A changes the method used by control unit 20A to generate the driving signal so that the driving signal is generated based on the encoder signal and the corrected command value corrected by the updated correction value.

Correction-value generator 31A may also output the generated correction value to controller 70. This enables controller 70 to generate the command signal that reflects the correction value.

(Operations)

The following describes operations performed by motor control device 10A having the above-described configuration.

Motor control device 10A performs second motor control processing in which part of processing is changed from the first motor control processing according to Embodiment 1.

Figure 5:
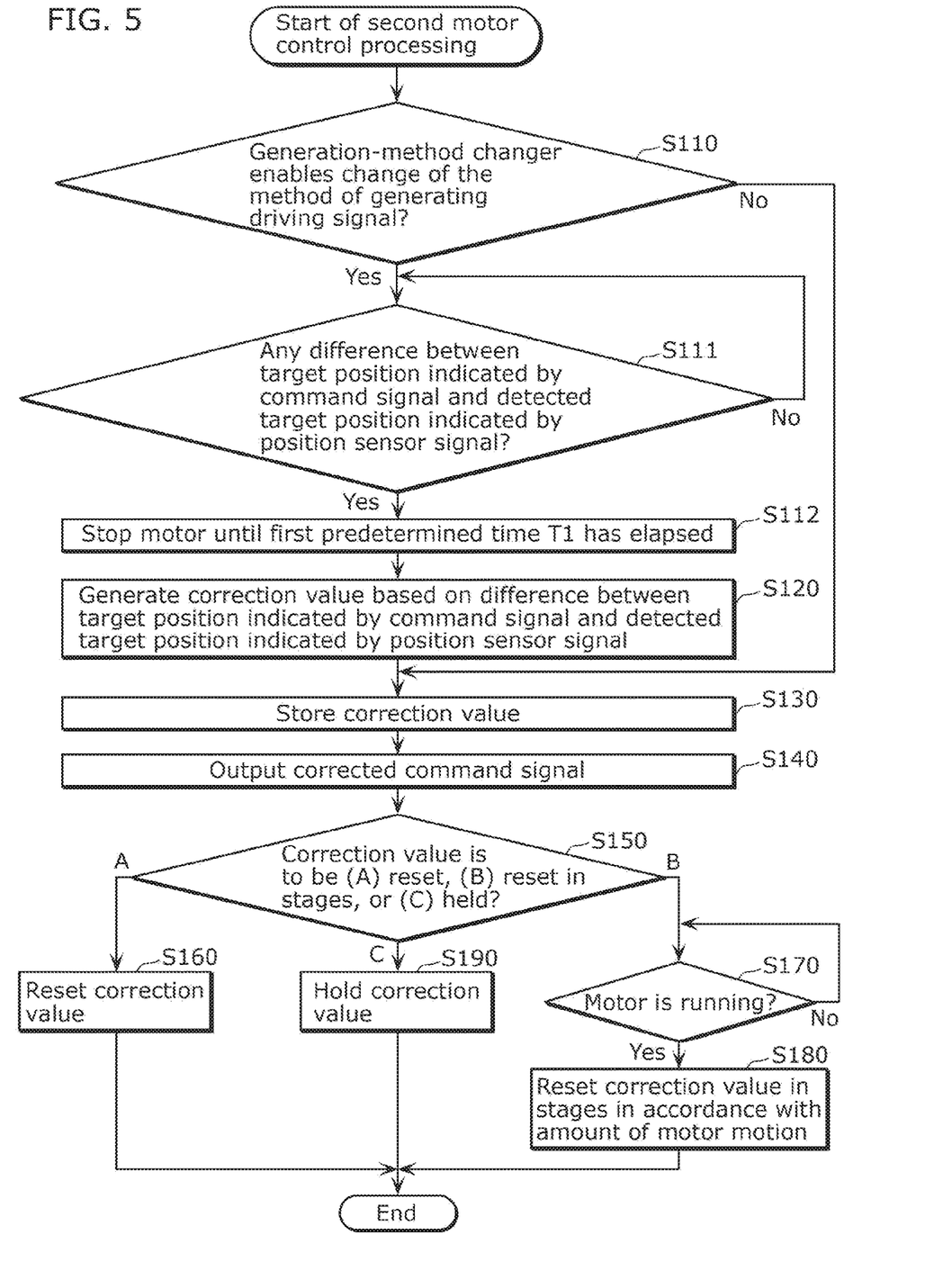
FIG. 5 is a flowchart of second motor control processing according to Embodiment 2.

FIG. 5 is a flowchart of the second motor control processing performed by motor control device 10A.

In the second motor control processing, processing in step S110 and processing from steps S120 to S190 are respectively similar to the processing in step S10 and the processing from steps S20 to S90 performed in the first motor control processing according to Embodiment 1. That is, the second motor control processing is processing in which control unit 20, generation-method changer 30, correction-value generator 31, and driving-signal generator 21 in the processing in step S10 and the processing from steps S20 to S90 are replaced by control unit 20A, generation-method changer 30A, correction-value generator 31A, and driving-signal generator 21A, respectively. Therefore, the following description focuses on processing in step S111 and processing in step S112.

In the processing in step S110, if generation-method changer 30A enables the change of the method used by control unit 20A to generate the driving signal (Yes in step S110), temporary stop device 33 waits for until a difference occurs between the target position indicated by the command signal and the detected target position indicated by the position sensor signal (No is repeated in step S111), and when a difference occurs between the target position indicated by the command signal and the detected target position indicated by the position sensor signal (Yes in step S111), temporary stop device 33 outputs a motor stop signal for stopping motor 50 to driving-signal generator 21A. Then, after the elapse of first predetermined time T1 from the occurrence of the difference, temporary stop device 33 stops outputting the motor stop signal. In this way, temporary stop device 33 stops motor 50 until the elapse of first predetermined time T1 (step S112).

When the processing in step S112 has ends, i.e., after the elapse of first predetermined time T1 from the stop of motor 50, the second motor control processing proceeds to the processing in step S120.

(Consideration)

When there is a difference between the target position indicated by the command signal and the detected target position indicated by the position sensor signal, motor control device 10A with the above-described configuration first temporarily stops motor 50 and then generates the correction value after the elapse of first predetermined time T1 from temporal stopping motor 50. Then, motor control device 10A drives motor 50 in accordance with the command signal corrected by the generated correction value.

Since first predetermined time T1 has elapsed after the stop of motor 50, motor control device 10A is capable of generating a correction value after the damping of oscillations of moving part 60. This allows motor control device 10A to more accurately move moving part 60 to the actual target position.

When the position of object 65 falls within the detectable range of position sensor 61, motor control device 10A with the above-described configuration performs an operation of temporarily stopping moving mobile part 60 and, after the damping of oscillations of moving part 60, again moving the position of moving part 60 to the actual target position.

Embodiment 3

The following describes a motor control system according to Embodiment 3 configured by changing part of motor control system 1 according to Embodiment 1.

The following description of the motor control system according to Embodiment 3 focuses on points of difference from motor control system 1 according to Embodiment 1 while assuming that constituent elements that are similar to those of motor control system 1 have already been described and are thus given the same reference signs, and therefore omitting detailed description of those constituent elements.

Figure 6:
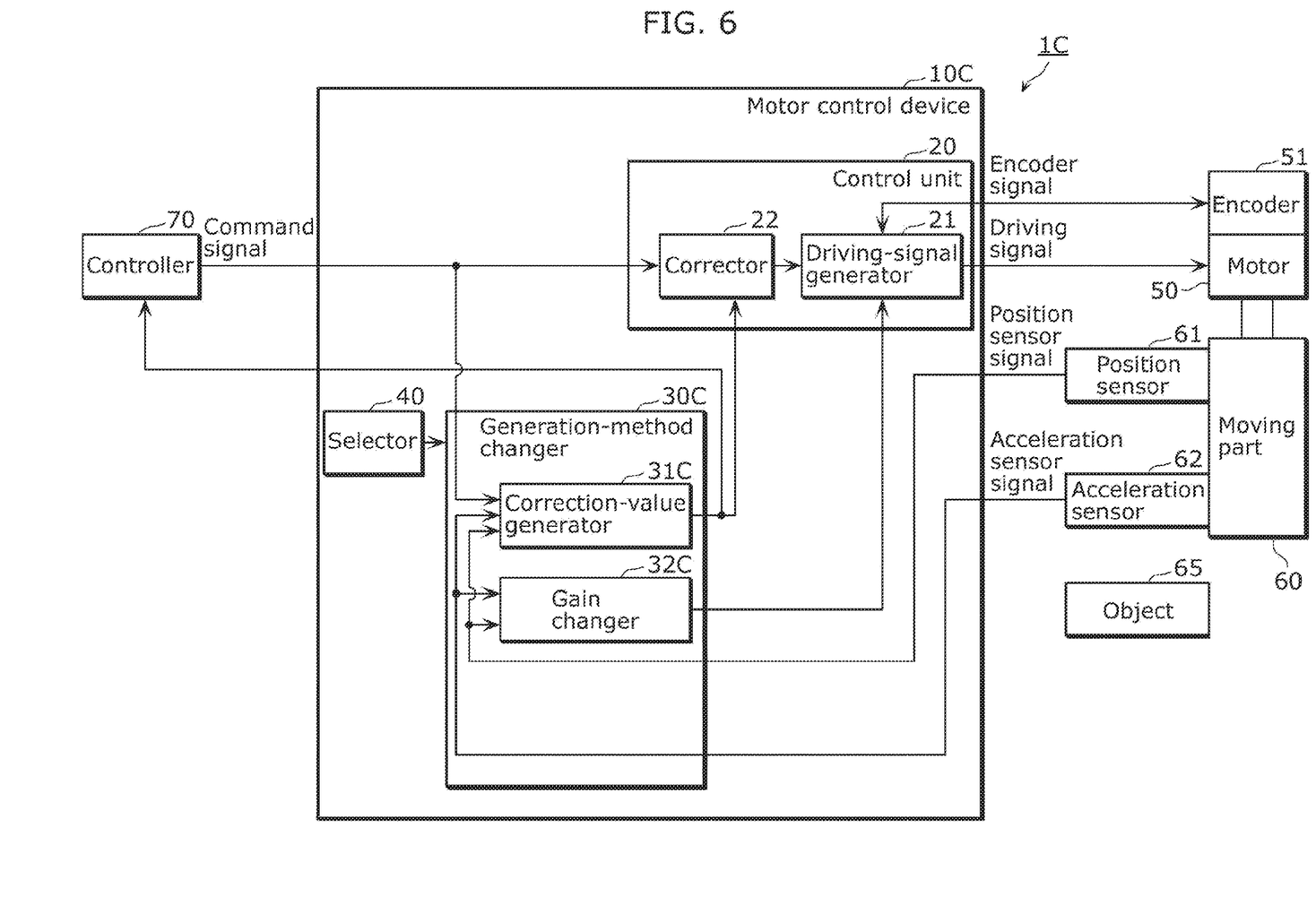
FIG. 6 is a block diagram illustrating a configuration of a motor control system according to Embodiment 3.

FIG. 6 is a block diagram illustrating a configuration of motor control system 1C according to Embodiment 3.

As illustrated in FIG. 6, motor control system 1C is configured by changing motor control device 10 in motor control system 1 according to Embodiment 1 into motor control device 10C and adding acceleration sensor 62. Motor control device 10C is configured by changing generation-method changer 30 in motor control device 10 into generation-method changer 30C. Generation-method changer 30C is configured by changing correction-value generator 31 and gain changer 32 in generation-method changer 30 into correction-value generator 31C and gain changer 32C, respectively.

Acceleration sensor 62 is mounted on moving part 60 and configured to detect the acceleration of moving part 60 and output an acceleration sensor signal indicating the detected acceleration of moving part 60 to motor control device 10C.

Generation-method changer 30C changes the method used by control unit 20 to generate the driving signal in accordance with the position sensor signal and the acceleration sensor signal.

After the elapse of second predetermined time T2 or more while the acceleration of moving part 60 indicated by the acceleration sensor signal is less than or equal to a predetermined threshold value and when there is a difference between the target position indicated by the command signal and the detected target position indicating the position of object 65 indicated by the position sensor signal, correction-value generator 31C generates a correction value for correcting the command signal such that the target position is changed by the difference, and outputs the generated correction value to corrector 22. Second predetermined time T2 as used herein may preferably be the duration of time that is longer than or equal to the duration of time from when the acceleration of moving part 60 becomes less than or equal to the predetermined threshold value to when oscillations of moving part 60 are damped.

Since second predetermined time T2 has elapsed after the acceleration of moving part 60 becomes constant, the correction-value generator is capable of generating the correction value after the damping of oscillations of moving part 60.

Note that second predetermined time T2 may be zero.

Correction-value generator 31C updates the correction value stored in corrector 22 by outputting the generated correction value to corrector 22. Accordingly, correction-value generator 31C changes the method used by control unit 20 to generate the driving signal such that the driving signal is generated based on the encoder signal and the corrected command value corrected by the updated correction value.

Correction-value generator 31C may also output the generated correction value to controller 70. This enables controller 70 to generate a command signal that reflects the correction value.

Gain changer 32C changes a gain parameter of driving-signal generator 21 in accordance with at least one of the position sensor signal or the acceleration sensor signal, the gain parameter being a parameter for determining the gain of the driving signal relative to the command signal. In this way, gain changer 32C changes the method used by control unit 20 to generate the driving signal such that the driving signal is generated based on the gain determined by the changed gain parameter. For example, gain changer 32C may change the gain parameter of driving-signal generator 21 when the difference between the target position and the position of moving part 60 indicated by the position sensor signal is greater than or equal to a predetermined value. As another alternative, for example, gain changer 32C may change the gain parameter of driving-signal generator 21 when the acceleration of moving part 60 indicated by the acceleration sensor signal is greater than or equal to a predetermined value. As yet another alternative, for example, gain changer 32C may change the gain parameter of driving-signal generator 21 when the difference between the target position and the position of moving part 60 indicated by the position sensor signal is greater than or equal to a predetermined value and the acceleration of moving part 60 indicated by the acceleration sensor signal is greater than or equal to a predetermined value.

(Operations)

The following describes operations performed by motor control device 10C having the above-described configuration.

Motor control device 10C performs third motor control processing for controlling motor 50 in accordance with the command signal, the encoder signal, the position sensor signal, and the acceleration sensor signal. This third motor control processing is processing in which part of processing is changed from the first motor control processing according to Embodiment 1.

Figure 7:
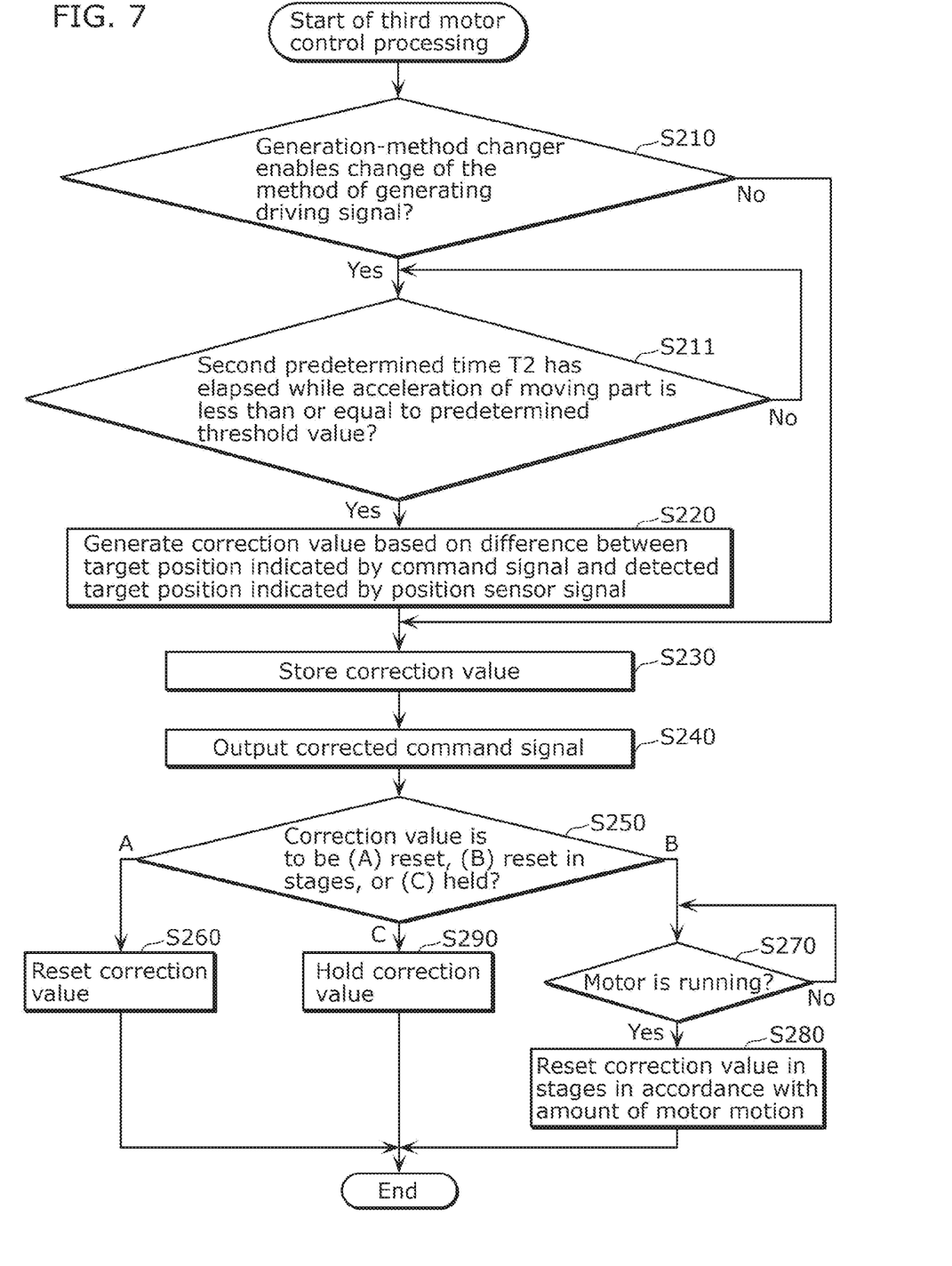
FIG. 7 is a flowchart of third motor control processing according to Embodiment 3.

FIG. 7 is a flowchart of the third motor control processing performed by motor control device 10C.

In the third motor control processing, processing in step S210 and processing from steps S220 to S290 are respectively similar to the processing in step S10 and the processing from steps S20 to S90 performed in the first motor control processing according to Embodiment 1. That is, the third motor control processing is processing in which generation-method changer 30 and correction-value generator 31 in the processing in step S10 and the processing from steps S20 to S90 performed in the first motor control processing are replaced by generation-method changer 30C and correction-value generator 31C, respectively. Therefore, the following description focuses on processing in step S211.

In the processing in step S210, if generation-method changer 30 enables the change of the method used by control unit 20 to generate the driving signal (Yes in step S210), correction-value generator 31 waits for until the elapse of second predetermined time T2 while the acceleration of moving part 60 indicated by the acceleration sensor signal is less than or equal to a predetermined threshold value (No is repeated in step S211), and after the elapse of second predetermined time T2 while the acceleration of moving part 60 indicated by the acceleration sensor signal is less than or equal to the predetermined threshold value (Yes in step S211), the third motor control processing proceeds to the processing in step S220.

(Consideration)

Motor control device 10C with the above-described configuration generates the correction value in accordance with also the acceleration of moving part 60 indicated by the acceleration sensor signal. Then, the motor control device drives motor 50 in accordance with the command signal corrected by the generated correction value.

This allows motor control device 10C with the above-described configuration to more accurately move moving part 60 to the actual target position.

Moreover, since second predetermined time T2 is waited for after the acceleration of moving part 60 becomes constant as described above, correction-value generator 31C is capable of generating the correction value after the damping of oscillations of moving part 60.

This allows motor control device 10C with the above-described configuration to more accurately move moving part 60 to the actual target position.

[Supplemental Remarks]

As described thus far, Embodiments 1 to 3 have been described by way of example of the technique disclosed in the application of the present disclosure. The present disclosure is, however, not intended to be limited to Embodiments 1 to 3. Those skilled in the art will readily appreciate that various modifications may be made to each exemplary embodiment, and other embodiments may be made by arbitrarily combining some constituent elements described in different exemplary embodiments without departing from the principles and spirit of the inventive concept of the present disclosure. Accordingly, all such modifications may be included within the scope of the present disclosure.

One aspect of the present disclosure is not limited to motor control device 10 or the like as described above, and may be a motor control method that uses characteristic component parts included in motor control device 10 or the like as its steps. Alternatively, one aspect of the present disclosure may also be a computer program for causing a computer to execute each characteristic stop included in the motor control method. As another alternative, one aspect of the present disclosure may also be a non-transitory computer-readable recording medium having such a computer program recorded thereon.

INDUSTRIAL APPLICABILITY

The present disclosure is widely applicable to systems or the like for controlling a motor.

The invention claimed is:

1. A motor control device comprising:
a control unit that generates a driving signal for driving a motor in accordance with a command signal and an encoder signal and outputs the driving signal generated to the motor, the command signal being a signal for setting a position of a moving part connected to the motor to a target position, the encoder signal indicating a position of the motor detected by an encoder; and
a generation-method changer that changes a generation method used by the control unit to generate the driving signal, in accordance with a position sensor signal indicating a detected target position that is the target position detected by a position sensor mounted on the moving part, wherein:
when there is a difference between the target position and the detected target position, the generation-method changer (1) generates a correction value for correcting the command signal so that the target position is changed by the difference; (2) outputs the correction value generated to the control unit, and (3) changes the generation method so that the driving signal is generated based on the encoder signal and the command signal corrected by the correction value, and
the control unit includes:
a corrector that stores the correction value, corrects the command signal based on the correction value stored and the command signal, and outputs a corrected command signal that is the command signal corrected; and
a driving-signal generator that generates the driving signal by performing feedback control for feeding back the encoder signal to the corrected command signal.

2. The motor control device according to claim 1, further comprising:
a selector that switches between whether the generation-method changer enables or disables change of the generation method.

3. The motor control device according to claim 1,
wherein the generation-method changer further outputs the correction value to a controller that generates the command signal.

4. The motor control device according to claim 1,
wherein the generation-method changer resets the correction value when a first predetermined condition is satisfied.

5. The motor control device according to claim 4,
wherein the first predetermined condition includes a condition that the motor is running, and the generation-method changer resets the correction value so that the correction value gradually approaches zero and ultimately becomes zero while the motor is running.

6. The motor control device according to claim 1, wherein the generation-method changer changes the generation method so that the driving signal is generated by changing a gain parameter in accordance with the position sensor signal, the gain parameter being a parameter for determining a gain of the driving signal relative to the command signal.

7. A motor control device, comprising:
a control unit that generates a driving signal for driving a motor in accordance with a command signal and an encoder signal and outputs the driving signal generated to the motor, the command signal being a signal for setting a position of a moving part connected to the motor to a target position, the encoder signal indicating a position of the motor detected by an encoder; and
a generation-method changer that changes a generation method used by the control unit to generate the driving signal, in accordance with a position sensor signal indicating a detected target position that is the target position detected by a position sensor mounted on the moving part, wherein:
when there is a difference between the target position and the detected target position, the generation-method changer (1) temporarily stops the motor; (2) after an elapse of a first predetermined time from temporarily stopping the motor, generates a correction value for correcting the command signal so that the target position is changed by the difference; (3) outputs the correction value generated; and (4) changes the generation method so that the driving signal is generated based on the encoder signal and the command signal corrected by the correction value, and
the control unit includes:
  a corrector that stores the correction value, corrects the command signal based on the correction value stored and the command signal, and outputs a corrected command signal that is the command signal corrected; and
  a driving-signal generator that generates the driving signal by performing feedback control for feeding back the encoder signal to the corrected command signal.

8. The motor control device according to claim 7, wherein the generation-method changer further outputs the correction value to a controller that generates the command signal.

9. A motor control device, comprising:
a control unit that generates a driving signal for driving a motor in accordance with a command signal and an encoder signal and outputs the driving signal generated to the motor, the command signal being a signal for setting a position of a moving part connected to the motor to a target position, the encoder signal indicating a position of the motor detected by an encoder; and
a generation-method changer that changes a generation method used by the control unit to generate the driving signal, in accordance with a position sensor signal indicating a detected target position that is the target position detected by a position sensor mounted on the moving part, wherein;
the generation-method changer changes the generation method in accordance with also an acceleration sensor signal that indicates an acceleration of the moving part detected by an acceleration sensor mounted on the moving part, and
when there is a difference between the target position and the detected target position and after an elapse of a second predetermined time or more while the acceleration of the moving part indicated by the acceleration sensor signal is less than or equal to a predetermined threshold value, the generation-method changer (1) generates a correction value for correcting the command signal so that the target position is changed by the difference; and (2) changes the generation method so that the driving signal is generated based on the encoder signal and the command signal corrected by the correction value.

10. The motor control device according to claim 9, further comprising:
a selector that switches between whether the generation-method changer enables or disables change of the generation method.

11. The motor control device according to claim 9, wherein the generation-method changer resets the correction value when a second predetermined condition is satisfied.

12. The motor control device according to claim 11, wherein the second predetermined condition includes a condition that the motor is running, and
the generation-method changer resets the correction value so that an absolute value of the correction value gradually approaches zero and ultimately becomes zero while the motor is running.

13. The motor control device according to claim 9, wherein the generation-method changer further outputs the correction value to a controller that generates the command signal.

14. The motor control device according to claim 9, wherein the generation-method changer changes the generation method so that the driving signal is generated by changing a gain parameter in accordance with at least one of the position sensor signal or the acceleration sensor signal, the gain parameter being a parameter for determining a gain of the driving signal relative to the command signal.

15. A motor control method comprising:
generating a driving signal for driving a motor in accordance with a command signal and an encoder signal, and outputting the driving signal generated to the motor, the command signal being a signal for setting a position of a moving part connected to the motor to a target position, the encoder signal indicating a position of the motor detected by an encoder; and
changing a method of generating the driving signal in the generating of the driving signal, in accordance with a position sensor signal indicating a detected target position that is the target position detected by a position sensor mounted on the moving part, wherein:
in the changing of the method, when there is a difference between the target position and the detected target position, (1) a correction value for correcting the command signal so that the target position is changed by the difference is generated, (2) the correction value generated is output, and (3) the generation method is changed so that the driving signal is generated based on the encoder signal and the command signal corrected by the correction value, and
the generating and outputting of the driving signal includes:

storing the correction value, correcting the command signal based on the correction value stored and the command signal, and outputting a corrected command signal that is the command signal corrected; and generating the driving signal by performing feedback control for feeding back the encoder signal to the corrected command signal.

16. A non-transitory computer-readable recording medium having recorded thereon a program for causing a motor control device that controls a motor to execute motor control processing, the motor control processing including:

generating a driving signal for driving the motor in accordance with a command signal and an encoder signal, and outputting the driving signal generated to the motor, the command signal being a signal for setting a position of a moving part connected to the motor to a target position, the encoder signal indicating a position of the motor detected by an encoder; and changing a method of generating the driving signal in the generating of the driving signal, in accordance with a position sensor signal indicating a detected target position that is the target position detected by a position sensor mounted on the moving part, wherein:

in the changing of the method, when there is a difference between the target position and the detected target position, (1) a correction value for correcting the command signal so that the target position is changed by the difference is generated, (2) the correction value generated is output, and (3) the generation method is changed so that the driving signal is generated based on the encoder signal and the command signal corrected by the correction value, and the generating and outputting of the driving signal includes:

storing the correction value, correcting the command signal based on the correction value stored and the command signal, and outputting a corrected command signal that is the command signal corrected; and generating the driving signal by performing feedback control for feeding back the encoder signal to the corrected command signal.

* * * * *